United States Patent
Murata

(10) Patent No.: US 8,364,035 B2
(45) Date of Patent: Jan. 29, 2013

(54) PON SYSTEM AND TERMINAL OPERATION REGISTERING METHOD

(75) Inventor: Hiroshi Murata, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 13/353,041

(22) Filed: Jan. 18, 2012

(65) Prior Publication Data

US 2012/0121263 A1    May 17, 2012

Related U.S. Application Data

(62) Division of application No. 12/281,536, filed as application No. PCT/JP2007/052951 on Feb. 19, 2007, now Pat. No. 8,180,218.

(30) Foreign Application Priority Data

Mar. 6, 2006 (JP) ................... 2006-059169

(51) Int. Cl.
*H04B 10/00* (2006.01)

(52) U.S. Cl. ............. 398/40; 398/43; 398/45; 398/100; 398/102; 398/168

(58) Field of Classification Search .............. 398/40, 398/43, 45, 100, 102
See application file for complete search history.

(56) References Cited

U.S. PATENT DOCUMENTS

| | | | |
|---|---|---|---|
| 7,558,482 B2 * | 7/2009 | Tanaka et al. ............. | 398/100 |
| 7,933,517 B2 * | 4/2011 | Ye et al. ................... | 398/3 |
| 2005/0138231 A1 | 6/2005 | Yamaguchi et al. | |

FOREIGN PATENT DOCUMENTS

| | | |
|---|---|---|
| JP | 8-008954 | 1/1996 |
| JP | 10-150386 | 6/1998 |
| JP | 2004-064749 | 2/2004 |
| JP | 2004-289780 | 10/2004 |
| JP | 2005-151424 | 6/2005 |
| JP | 2005-182624 | 7/2005 |
| JP | 2005-333318 | 12/2005 |

OTHER PUBLICATIONS

IEEE Standard 802.3 ah—2004, pp. 440-442, IEEE Computer Society, USA.
IEEE Standard 802.3 ah—2004, Clauses 60 and 64, pp. 304-308, 440-0442, 463, IEEE Computer Society, USA.
"Technology Basic Course [GE-PON Technology]", w/ English translation thereof, NTT Technical Journal, Sep. 1, 2005, pp. 91-94, vol. 17 No. 9, The Telecommunications Association, Japan.
Japanese Office Action, w/ English translation thereof, issued in Japanese Patent Application No. 2010-002994, dated Nov. 22, 2011.

* cited by examiner

*Primary Examiner* — Dung Nguyen
(74) *Attorney, Agent, or Firm* — McDermott Will & Emery LLP

(57) ABSTRACT

In a PON system in which communication is performed at a plurality of types of transmission rate (L, M, and H) in an upstream direction from a plurality of terminals connected to a station apparatus through optical fibers, within a discovery period for allowing an unregistered terminal to be recognized by station apparatus, the terminal makes a discovery response at one type of transmission rate (L). With this configuration, station apparatus can wait for a discovery response with a receive function being allowed to support transmission rate (L).

2 Claims, 8 Drawing Sheets

US 8,364,035 B2

PON SYSTEM AND TERMINAL OPERATION REGISTERING METHOD

RELATED APPLICATIONS

This application is a Divisional of U.S. application Ser. No. 12/281,536, filed on Sep. 3, 2008 now U.S. Pat. No. 8,180,218, which is the U.S. National Phase under 35 U.S.C. §371 of International Application No. PCT/JP2007/052951, filed on Feb. 19, 2007, which in turn claims the benefit of Japanese Application No. 2006-059169, filed on Mar. 6, 2006, the disclosures of which Applications are incorporated by reference herein.

TECHNICAL FIELD

The present invention relates to a PON (Passive Optical Network) system that connects a station apparatus to a plurality of terminals by an optical fiber network.

BACKGROUND ART

A PON system is one in which a station apparatus serving as an aggregate station is connected to terminals installed in a plurality of subscribers' homes by an optical fiber network that branches one optical fiber into a plurality of optical fibers through an optical coupler (see, for example, Japanese Patent Laying-Open No. 2004-64749 (FIG. 4) and Japanese Patent Laying-Open No. 2004-289780 (FIG. 31)). Upstream burst communication from the terminals to the station apparatus is managed in a time-sharing manner by the station apparatus in order to prevent signal collisions.

Although initially such upstream burst communication is considered at a certain transmission rate, in the future a stepwise increase in transmission rate is expected. However, even if provision of high transmission rate services begins, not all subscribers want the services at the same time, resulting in a multi-rate PON system in which for upstream communication, an existing transmission rate and a high transmission rate exceeding the existing transmission rate coexist in one PON system (see, for example, Japanese Patent Laying-Open No. 8-8954 (FIG. 2)).

In a multi-rate PON system such as that described above, for terminals registered (i.e., in operation) in the PON system, a station apparatus manages upstream communication in a time-sharing manner. However, for example, a terminal that attempts to participate in the PON system by power-on from a power-off state is not yet recognized by the station apparatus at that point and thus the terminal does not have a chance to perform upstream communication. In view of this, periodically, a registration accepting process, called a discovery process, based on a standard, is performed.

However, even in such a case, since the terminal that attempts to participate is not yet under the control of the station apparatus, it is completely unknown at which transmission rate a registration request signal is to be transmitted. Accordingly, it is not always that the station apparatus always succeeds in receiving a registration request signal, and even if succeeded, it takes time to establish synchronization. Namely, the terminal that attempts to participate in the PON system cannot be promptly and reliably registered.

DISCLOSURE OF THE INVENTION

In view of such a problem, an object of the present invention is therefore to promptly and reliably register a terminal that attempts to participate in a PON system.

According to the present invention, there is provided a PON system in which communication is performed at a plurality of types of transmission rate in an upstream direction from a plurality of terminals connected to a station apparatus through optical fibers, wherein within a discovery period for allowing an unregistered terminal to be recognized by the station apparatus, the terminal makes a discovery response at a limited predetermined transmission rate among the plurality of types of transmission rate.

In the PON system configured in the above-described manner, since a discovery response is made at a limited predetermined transmission rate, the station apparatus can wait for a discovery response with a receive function being narrowed down to the predetermined transmission rate. Accordingly, comparing with the case in which there is a possibility for all transmission rates, a discovery response from an unregistered terminal can be promptly and reliably received.

In the above-described PON system, it is preferable that the predetermined transmission rate be of one type and an unregistered terminal make a discovery response using the transmission rate within the discovery period.

In this case, since a discovery response is made at one type of transmission rate, the station apparatus can wait for a discovery response with the receive function being allowed to support that transmission rate. Accordingly, a discovery response from an unregistered terminal can be promptly and reliably received.

In the above-described PON system, the predetermined transmission rate can be specified by the station apparatus.

In this case, the transmission rate can be switched depending on the times. For example, in times where there are both a terminal of type A with a transmission rate of L and a terminal of type B with a nominal transmission rate of M (>L) and a discovery response transmission rate of L, L should be specified as the predetermined transmission rate. Thereafter, if replacement of the terminals is performed and as a result the terminal of type A is removed and only the terminal of type B remains, then M is specified as the predetermined transmission rate. As such, while operating the PON system, a transmission rate used for discovery is increased according to generational change in terminals, whereby transmission efficiency can be increased.

In the above-described PON system, the configuration may be such that the station apparatus sets the discovery period at different times for each of the plurality of types of transmission rate and specifies a transmission rate at which a discovery response should be made, and an unregistered terminal makes a discovery response within a discovery period corresponding to a transmission rate used by the unregistered terminal.

In this case, since during one discovery period a discovery response is made at one type of transmission rate, the station apparatus can wait for a discovery response with the receive function being allowed to support that transmission rate. Accordingly, a discovery response from an unregistered terminal can be promptly and reliably received. In addition, since it becomes unnecessary for each terminal to have the ability to perform transmission at a plurality of transmission rates, the terminals are simplified, contributing to cost reduction.

In the above-described PON system, the configuration may be such that the station apparatus transmits, in downstream communication to the terminals, a signal for starting a discovery process at a plurality of types of wavelength having a one-to-one correspondence with the transmission rates and an unregistered terminal having been able to receive the signal makes a discovery response at a transmission rate used by the unregistered terminal.

In this case, with respect to one wavelength at which a signal for starting a discovery process is transmitted in downstream communication, a discovery response is made at one type of transmission rate and thus the station apparatus can wait for a discovery response with the receive function being allowed to support that transmission rate. Accordingly, a discovery response from an unregistered terminal can be promptly and reliably received. Furthermore, by wavelength multiplexing of downstream communication, downstream communication capacity can be increased as compared with the case of one downstream wavelength.

According to another aspect of the present invention, there is provided a terminal registering method for a PON system in which communication is performed at a plurality of types of transmission rate in an upstream direction from a plurality of terminals connected to a station apparatus through an optical fiber network, the method including: setting a discovery period for causing the station apparatus to recognize an unregistered terminal and notifying the terminal of the discovery period; the terminal, making a discovery response at a specified predetermined transmission rate among the plurality of types of transmission rate; and registering a terminal having made a discovery response within the discovery period, in the PON system.

By the terminal registering method such as that described above, since a discovery response is made at a specified predetermined transmission rate, the station apparatus can wait for a discovery response with the receive function being narrowed down to the predetermined transmission rate. Accordingly, comparing with the case in which there is a possibility for all transmission rates, a discovery response from an unregistered terminal can be promptly and reliably received.

BEST MODES FOR CARRYING OUT THE INVENTION

Figure 1:
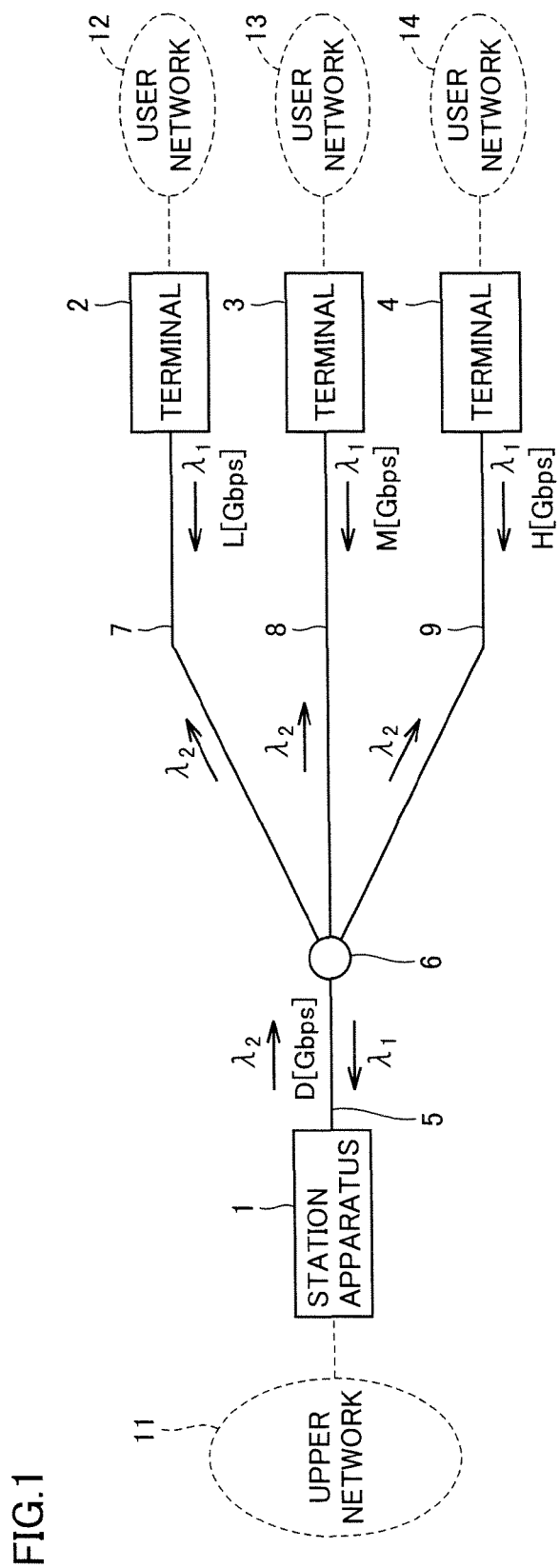
FIG. 1 is a connection diagram of a PON system according to one embodiment of the present invention.

FIG. 1 is a connection diagram of a PON system according to one embodiment of the present invention. In the drawing, a station apparatus 1 is installed as an aggregate station for a plurality of terminals 2 to 4. Terminals 2 to 4 are respectively installed in PON system subscribers' homes. An optical fiber network (5 to 9) is configured in which one optical fiber 5 connected to station apparatus 1 is branched into a plurality of optical fibers (branch lines) 7 to 9 through an optical coupler 6, and terminals 2 to 4 are connected to the respective terminal ends of branched optical fibers 7 to 9. Furthermore, station apparatus 1 is connected to an upper network 11 and terminals 2 to 4 are connected to their corresponding user networks 12 to 14.

Note that although FIG. 1 shows three terminals 2 to 4, it is possible to branch into, for example, 32 through one optical coupler 6 to connect 32 terminals. Note also that although in FIG. 1 only one optical coupler 6 is used, by providing a plurality of optical couplers in a series alignment, more terminals can be connected to station apparatus 1.

In FIG. 1, for an upstream direction from each of terminals 2 to 4 to station apparatus 1, data is transmitted at a wavelength $\lambda_1$. In contrast, for a downstream direction from station apparatus 1 to terminals 2 to 4, data is transmitted at a wavelength $\lambda_2$. These wavelengths $\lambda_1$ and $\lambda_2$ can have values in the following range, based on the IEEE Standard 802.3ah-2004, Clause60:

1260 mm $\leq \lambda_1 \leq$ 1360 nm
1480 mm $\leq \lambda_2 \leq$ 1500 nm.

The transmission rates of terminals 2, 3, and 4 for upstream communication are respectively L [Gbps], M [Gbps], and H [Gbps]. Here, the values of L, M, H have a relationship of L<M<H; for example, L=1, M=2, and H=10. On the other hand, the transmission rate of station apparatus 1 for downstream communication is of one type, D [Gbps], and the value of D is, for example, 1.

Note that although in the present example three terminals are provided and the terminals have three different types of transmission rate, there are various patterns in the number of terminals and the number of different transmission rates.

Figure 2:
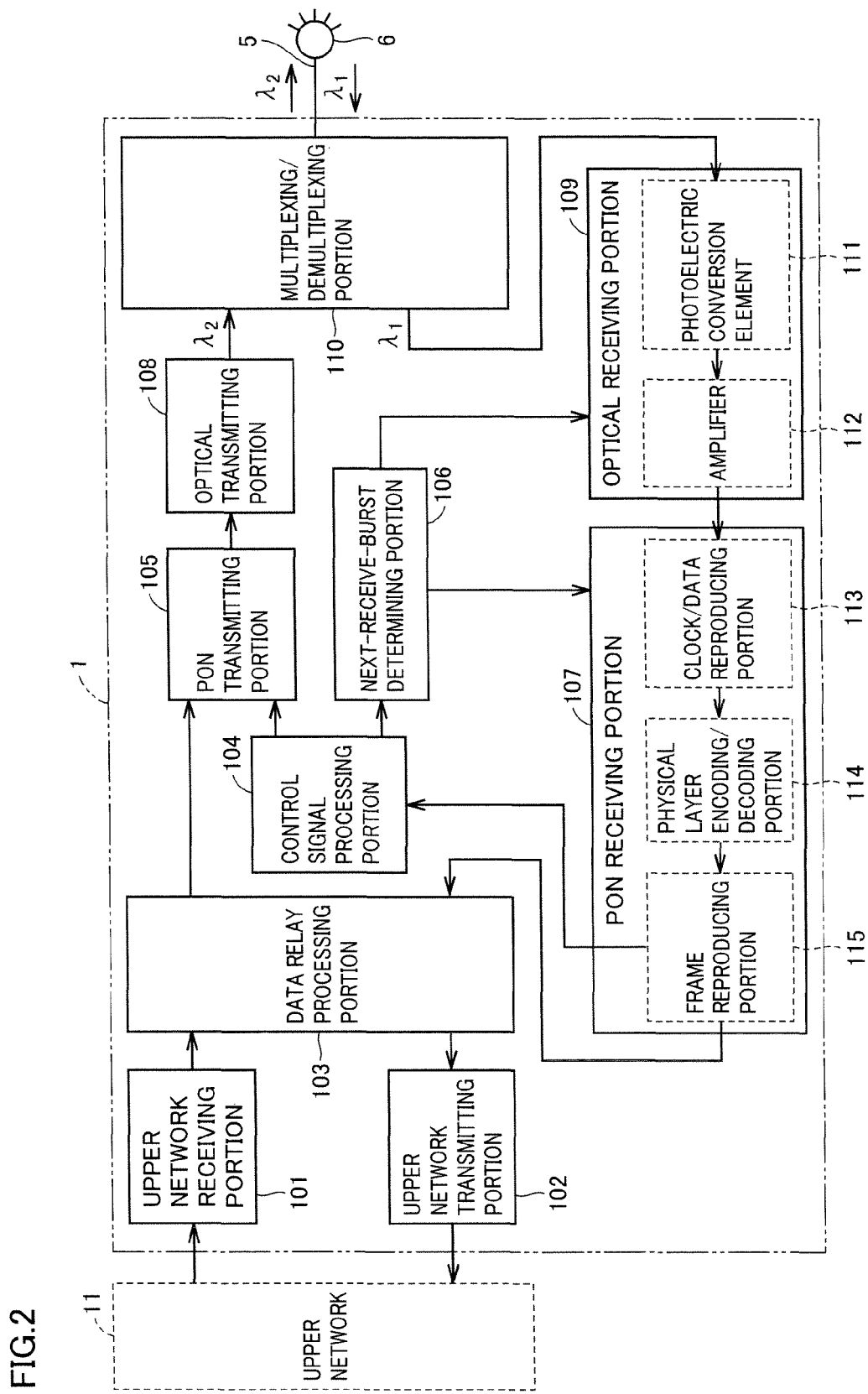
FIG. 2 is a block diagram showing a schematic internal configuration of a station apparatus 1 in the PON system in FIG. 1.

FIG. 2 is a block diagram showing a schematic internal configuration of station apparatus 1. Each portion (101 to 115) in station apparatus 1 is connected to each other as shown in the drawing. In the drawing, a frame from upper network 11 is received by an upper network receiving portion 101 and sent to a data relay processing portion 103. Data relay processing portion 103 passes the frame to a PON transmitting portion 105. The frame is converted by an optical transmitting portion 108 to an optical signal with wavelength $\lambda_2$ and a transmission rate D [Gbps] and the optical signal is sent to terminals 2 to 4 through a multiplexing/demultiplexing portion 110.

On the other hand, optical signals (wavelength $\lambda_2$ and transmission rates L/M/H [Gbps]) transmitted in the upstream direction from terminals 2 to 4 (FIG. 1) pass through multiplexing/demultiplexing portion 110 and are received by an optical receiving portion 109. Optical receiving portion 109 includes therein a photoelectric conversion element 111 and an amplifier 112. Photoelectric conversion element 111 is a semiconductor light receiving element, such as a photodiode or avalanche photodiode, and outputs an electrical signal according to the amount of light received. Amplifier 112 amplifies the electrical signal and outputs the amplified electrical signal. The output signal from amplifier 112 is inputted to a PON receiving portion 107.

PON receiving portion 107 includes therein a clock/data reproducing portion 113, a physical layer encoding/decoding portion 114, and a frame reproducing portion 115. Clock/data reproducing portion 113 reproduces a timing component (clock) and data in synchronization with the electrical signal received from amplifier 112. Physical layer encoding/decoding portion 114 decodes codes provided in the reproduced data. Frame reproducing portion 115 detects a frame boundary from the decoded data and reconstructs, for example, an Ethernet (registered trademark) frame. Also, frame reproducing portion 115 reads a header part of the frame and thereby determines whether the received frame is a data frame or a frame of control information for medium access control, such as a report frame.

Note that an example of the control information includes an MPCP (Multi-Point Control Protocol) PDU (Protocol Data Unit) described in the IEEE Standard 802.3ah-2004, Clause 64. A grant that is control information used by station apparatus 1 to instruct terminals 2 to 4 about upstream data send-out start time and the amount of send outs allowed for upstream data, or a report that is control information used by terminals 2 to 4 to notify station apparatus 1 of a value regarding the amount of upstream data accumulated is a type of the MPCP PDU.

If, as a result of the above-described determination, the frame is a data frame, then frame reproducing portion 115 sends the data frame to data relay processing portion 103. Data relay processing portion 103 performs a predetermined relay process, such as changing header information of the data frame and performing transmission control on an upper network transmitting portion 102. The processed frame is sent out from upper network transmitting portion 102 to upper network 11. If, as a result of the above-described determination, the frame is a report frame, then frame reproducing portion 115 sends the report frame to a control signal processing portion 104. Control signal processing portion 104 generates, based on the report, a grant frame as control information. The grant frame is transmitted in the downstream direction from PON transmitting portion 105 and optical transmitting portion 108 through multiplexing/demultiplexing portion 110 at wavelength $\lambda_2$ and transmission rate D [Gbps].

The above-described grant is also sent to a next-receive-burst determining portion 106. This next-receive-burst determining portion 106 stores transmission rates used by terminals 2 to 4 and identifies, based on a grant, timing at which a burst signal is to be received next and a transmission rate thereof. Then, the identified transmission rate is notified to optical receiving portion 109 and PON receiving portion 107. Optical receiving portion 109 and PON receiving portion 107 can allow a receive function to support the identified transmission rate in accordance with that timing.

Specifically, the configuration is such that by changing circuit parameters in relation to burst reception, such as the multiplication factor of photoelectric conversion element 111 and the gain of amplifier 112 in optical receiving portion 109, a quantization determination threshold in PON receiving portion 107, and lock tolerance and a reference clock frequency in clock/data reproducing portion 113, the receive function can be allowed to support a predetermined transmission rate. For example, in the case in which terminals 2 to 4 are connected under the same line condition (required optical power budget is the same) and transmission quality of the same bit error rate needs to be satisfied, when a signal is received from terminal 4 whose transmission rate is higher as compared with those of terminals 2 and 3, the gain of optical receiving portion 109 is reduced to widen the band.

Alternatively, for example, when terminals 2 and 4 perform upstream burst communication at 1.25 Gbps and 10.3125 Gbps, respectively, if clock/data reproducing portion 113 is notified in advance that the transmission rates of next bursts are respectively 1 Gbps and 10 Gbps, then all it has to do thereafter is just to adjust fractions; accordingly, synchronization of clock/data reproducing portion 113 can be reliably established in a short time. Furthermore, when it is premised that for 1.25 Gbps and 10.3125 Gbps physical layer encoding/decoding is performed by 8 B/10 B encoding and 64 B/66 B encoding, respectively, a decoding circuit that should be used for the next bursts can be easily and reliably selected.

Figure 3:
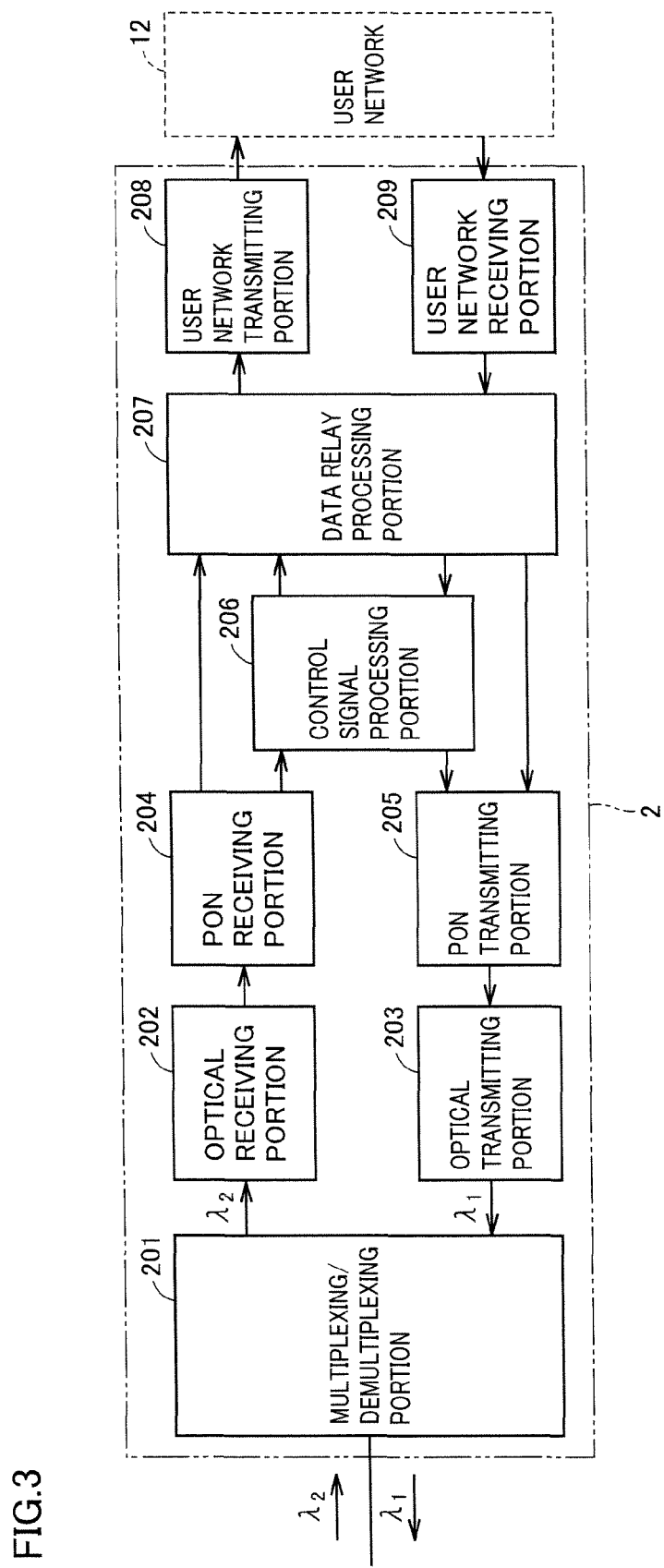
FIG. 3 is a block diagram showing a schematic internal configuration of a terminal in the PON system in FIG. 1.

FIG. 3 is a block diagram showing a schematic internal configuration of terminal 2 and portions (201 to 209) in terminal 2 are connected to each other as shown in the drawing. In FIG. 3, an optical signal to be transmitted in the downstream direction from station apparatus 1 (FIG. 1) passes through a multiplexing/demultiplexing portion 201 and is converted by an optical receiving portion 202 to an electrical signal and furthermore the electrical signal is received by a PON receiving portion 204.

PON receiving portion 204 reads a header part (including a preamble part) of a received frame and thereby determines whether the frame is destined for terminal 2 (here, it indicates terminal 2 or any apparatus in user network 12 present under terminal 2). If, as a result of the determination, the frame is destined for terminal 2, then PON receiving portion 204 captures the frame, otherwise discards the frame. For example, an example of header information for performing the above-described destination determination includes a logical link identifier (LLID) described in the IEEE Standard 802.3ah-2004.

Furthermore, PON receiving portion 204 reads the header part of the frame and thereby determines whether the received frame is a data frame or a grant frame. If, as a result of the determination, the frame is a data frame, then PON receiving portion 204 sends the data frame to a data relay processing portion 207. Data relay processing portion 207 performs a predetermined relay process, such as performing transmission control on a user network transmitting portion 208. The processed frame is sent out from user network transmitting portion 208 to user network 12.

If, as a result of the above-described determination, the frame is a grant frame, then PON receiving portion 204 transfers the grant frame to a control signal processing portion 206. Control signal processing portion 206 instructs data relay processing portion 207 about upstream send out, based on the grant frame.

On the other hand, a frame from user network 12 is received by a user network receiving portion 209 and transferred to data relay processing portion 207. The transferred frame is temporarily accumulated in a buffer memory in data relay processing portion 207 and the amount of data of the frame is notified to control signal processing portion 206. Control signal processing portion 206 performs transmission control on a PON transmitting portion 205 to allow PON transmitting portion 205 to output the frame accumulated in the buffer memory at predetermined timing, and generates a report frame based on the notified amount of data accumulated in the buffer memory and allows PON transmitting portion 205 to output the report frame. The output from PON transmitting portion 205 is converted by an optical transmitting portion 203 to an optical signal and the optical signal is transmitted in the upstream direction through multiplexing/demultiplexing portion 201 as a signal with wavelength $\lambda_1$ and transmission rate L [Gbps].

Figure 4:
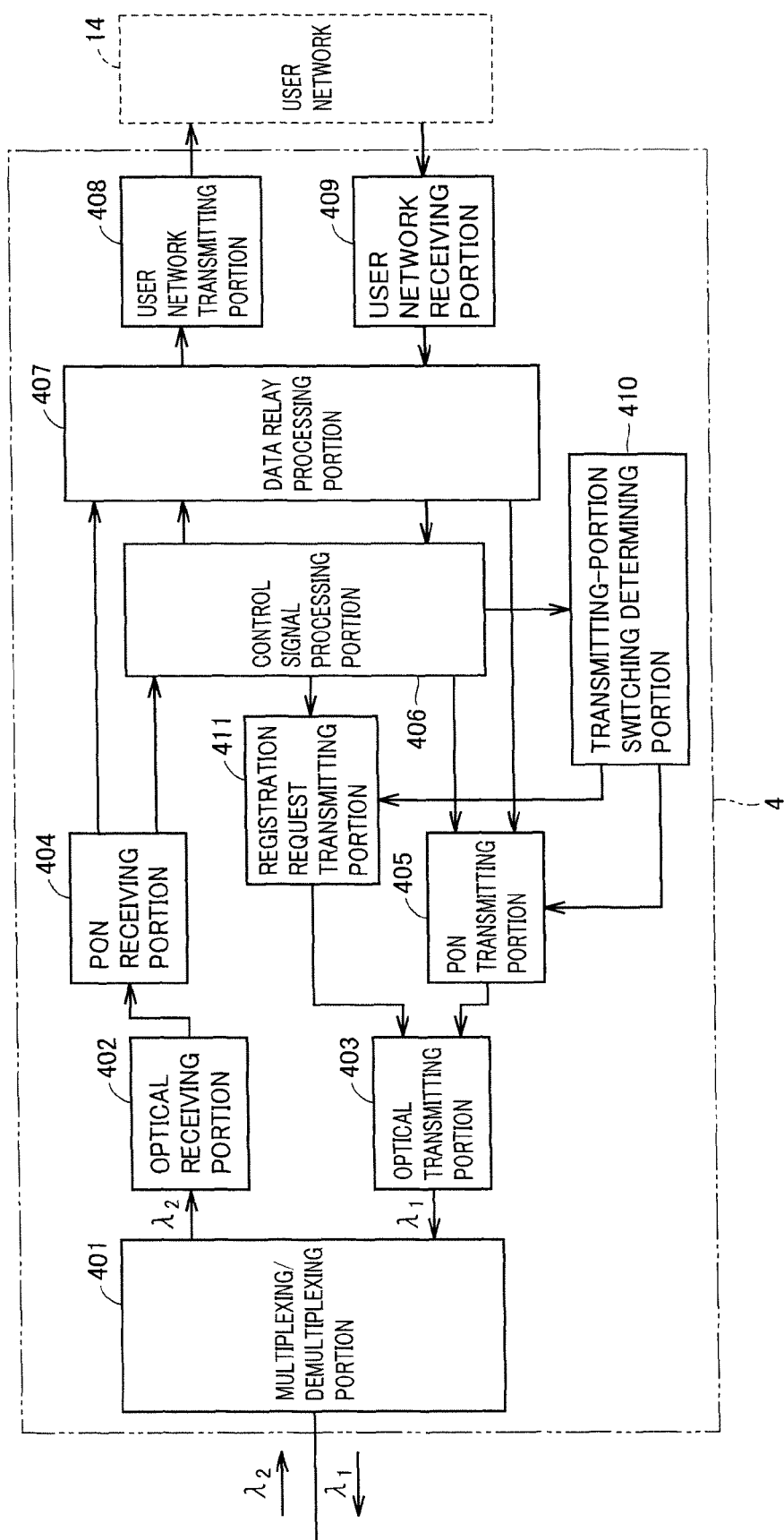
FIG. 4 is a block diagram showing a schematic internal configuration of another terminal in the PON system in FIG. 1.

FIG. 4 is a block diagram showing a schematic internal configuration of terminal 4 (transmission rate H [Gbps]) and portions (401 to 411) in terminal 4 are connected to each other as shown in the drawing. Portions 401 to 409 of the portions are circuit elements corresponding to 201 to 209 in FIG. 3 and thus have similar functions. Differences from FIG. 3 is that a registration request transmitting portion 411 is provided between a control signal processing portion 406 and an optical receiving portion 403, that switching between PON transmitting portion 405 and registration request transmitting portion 411 can be performed by a transmitting-portion switching determining portion 410, and that this transmitting-portion switching determining portion 410 performs transmitting-portion switching in response to an instruction from a control signal processing portion 406.

Normally, as a transmitting portion, PON transmitting portion 405 is to operate. Note that terminal 4 for the case in which PON transmitting portion 405 operates is substantially similar to terminal 2.

Terminal 3 also has a configuration similar to that in FIG. 4 in terms of appearance. Note, however, that as described above the transmission rate of terminal 3 is M [Gbps] and thus is different from that of terminal 4.

Next, with reference to a sequence diagram of FIG. 5, the operational steps of the PON system configured in the above-described manner will be described. Note that although the sequence diagram shows operations between station apparatus 1 and terminal 2, the operations are also similarly applied to other terminals 3 and 4.

Figure 5:
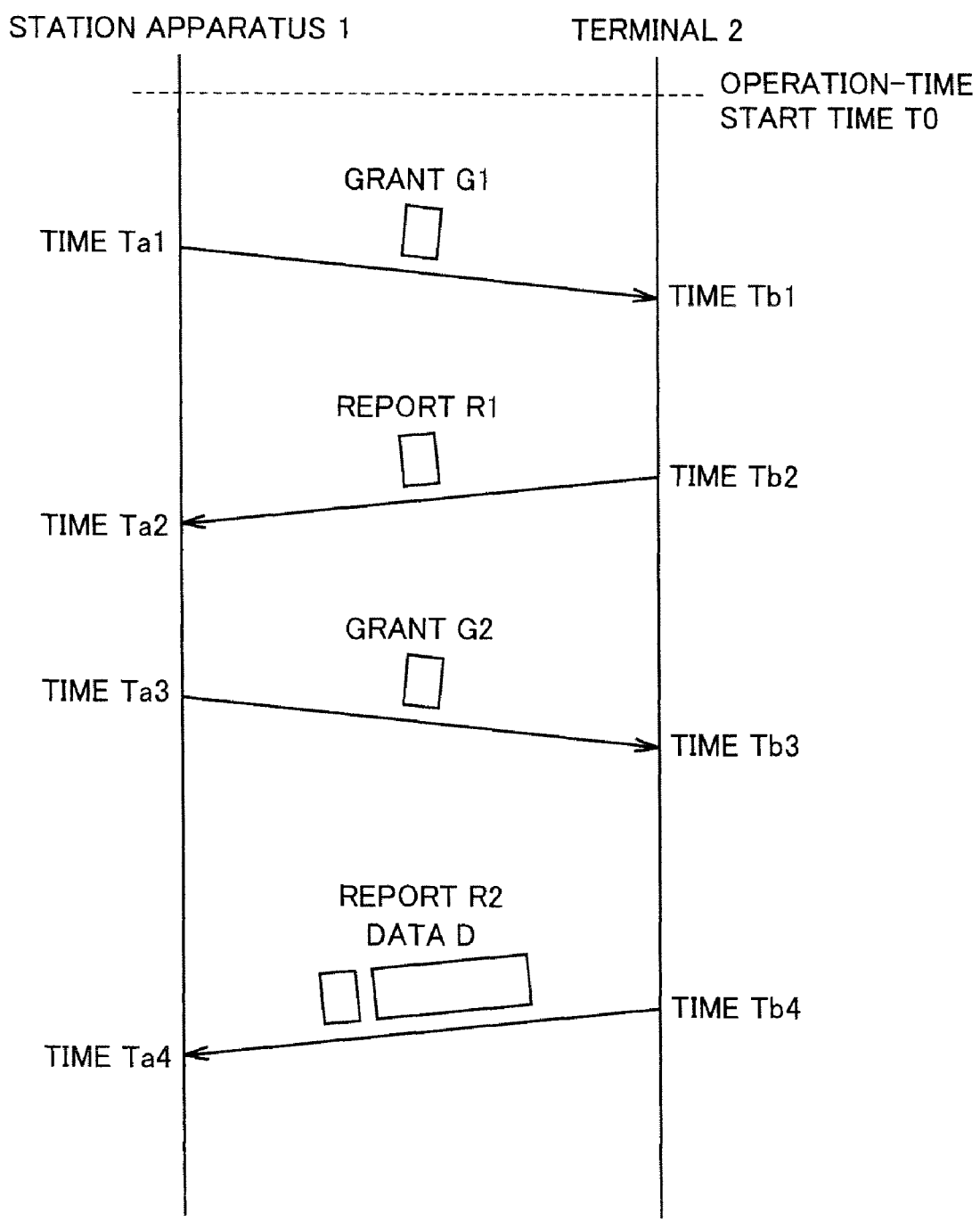
FIG. 5 is a sequence diagram showing operations between the station apparatus and a terminal.

In FIG. 5, station apparatus 1 has already calculated RTT (Round Trip Time) for terminal 2 at the time of operation-time start time T0. At time Ta1, in order to allow terminal 2 to notify of the amount of send outs requested, station apparatus 1 transmits a grant (grant frame) G1 including report send-out start time Tb2, to terminal 2. The report send-out start time Tb2 is calculated so as not to collide with reports to be transmitted from other terminals 3 and 4.

When terminal 2 receives the grant G1 destined therefor, terminal 2 calculates the amount of send outs requested by referring to the amount of data accumulated in the buffer memory of data relay processing portion 207 and sends out a report (report frame) R1 including the amount of send outs requested, to station apparatus 1 at the report send-out start time Tb2 included in the grant G1.

When station apparatus 1 receives the report R1, station apparatus 1 computes such a value that is less than or equal to a fixed or variable maximum amount of send outs allowed and that allows data of an amount indicated by the amount of data in the buffer memory included in the report R1 to be sent as much as possible, and inserts a computation result in a grant G2 as the amount of send outs allowed. When the amount of send outs requested included in the report R1 is zero, a computation result obtained by station apparatus 1 is zero and thus a band is not assigned. However, since station apparatus 1 needs terminal 2 to send out a report R2, station apparatus 1 sends out a grant G2 to terminal 2 without fail.

Send-out start time Tb4 included in the grant G2 is calculated using the last scheduled terminal data receive time, the last amount of send outs allowed for terminal 2, and the present RTT for terminal 2 which are already computed and guard time that is a fixed time, such that data and a report do not collide with data or reports from other terminals 3 and 4. Note that station apparatus 1 calculates time Ta3 at which the grant G2 including the amount of send outs allowed and the send-out start time Tb4 is sent out, such that the grant G2 arrives at terminal 2 before the send-out start time Tb4.

When terminal 2 receives the grant G2 destined therefor, terminal 2 sends out data D of an amount equivalent to the amount of send outs allowed, together with a report R2 including a next amount of send outs requested, to station apparatus 1 at the send-out start time Tb4 included in the grant G2. The report R2 is sent out immediately before or after the data D. When the report R2 is sent out immediately before the data D, a value to be reported to station apparatus 1 as the amount of send outs requested is a difference between the amount of data accumulated in the buffer memory and the amount of the data D.

When station apparatus 1 receives the data D and the report R2, station apparatus 1 sends out the data D to upper network 11 and performs a process on the report R2 that is similar to the process performed on the report R1. The sequence process described above is independently performed on all terminals 2 to 4 and the processes at times Ta3 to Ta4 are repeated until the operation time ends.

Figure 6:
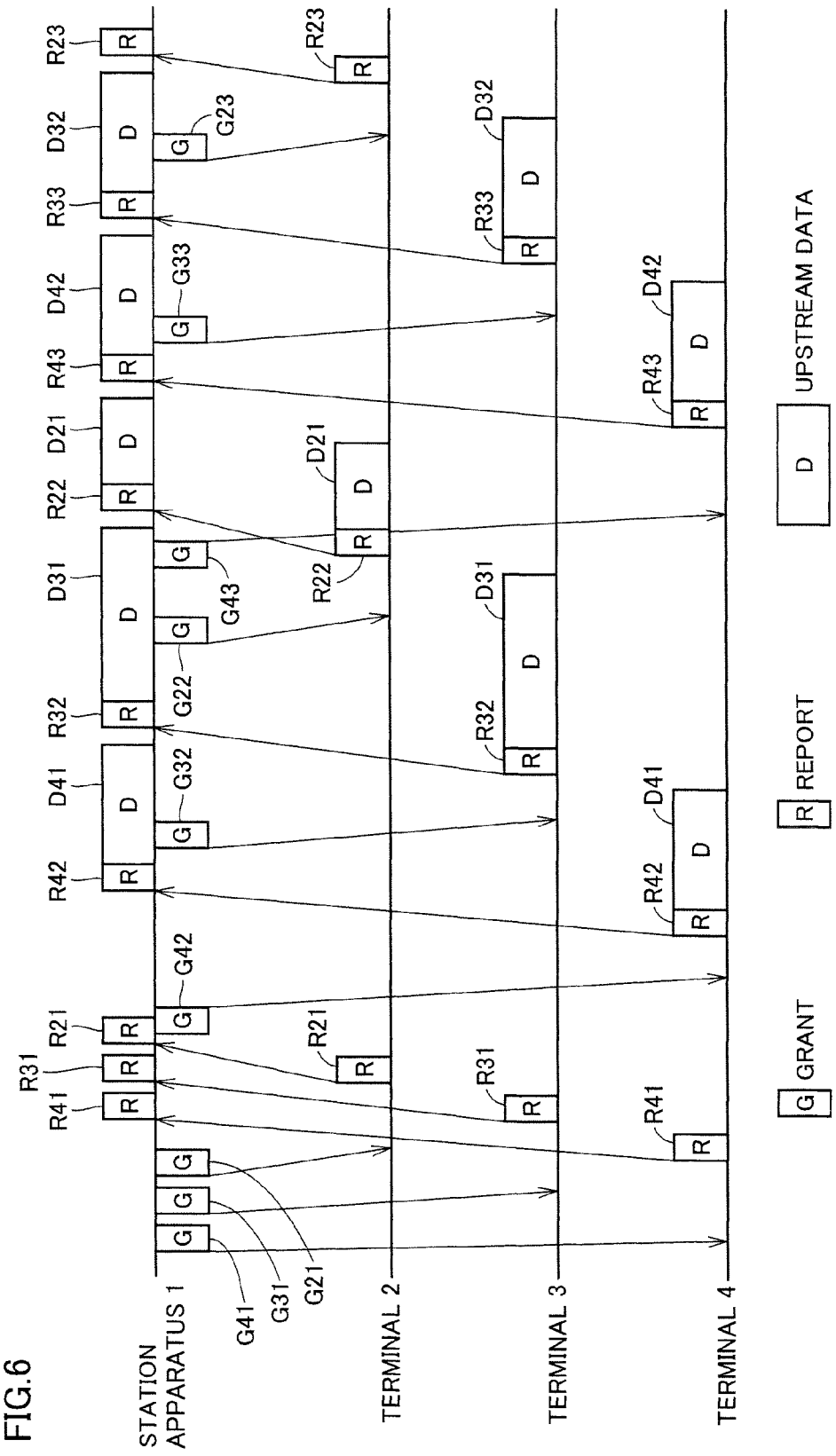
FIG. 6 is a sequence diagram showing a band assignment to terminals and transmission and reception in relation to upstream communication between the station apparatus and the terminals.

FIG. 6 is a sequence diagram showing a band assignment to terminals 2 to 4 and transmission and reception in relation to upstream communication between station apparatus 1 and terminals 2 to 4, and showing an example of a distribution assignment scheme. The operation of the system will be described assuming that time proceeds from the left to the right in the drawing and station apparatus 1 is viewed as a subject.

First, station apparatus 1 sequentially sends out grants G41, G31, and G21 to terminals 4, 3, and 2, respectively. Then, when station apparatus 1 receives reports R41, R31, and R21 from terminals 4, 3, and 2, station apparatus 1 sends out a grant G42 destined for terminal 4 that is the first one to be allowed to send out data.

Station apparatus 1 receives data D41 and a next report R42 that are sent out from terminal 4 and, in parallel with this, sends out a grant G32 destined for terminal 3. Station apparatus 1 receives data D31 and a next report R32 that are sent out from terminal 3 and, in parallel with this, sends out a grant G22 destined for terminal 2. Subsequently, station apparatus 1 also sends out a grant G43 destined for terminal 4.

Station apparatus 1 receives data D21 and a next report R22 that are sent out from terminal 2. Also, station apparatus 1 receives data D42 and a next report R43 that are sent out from terminal 4 and, in parallel with this, sends out a grant G33 destined for terminal 3. Furthermore, station apparatus 1 receives data D32 and a next report R33 that are sent out from terminal 3 and, in parallel with this, sends out a grant G23 destined for terminal 2. Here, if there is no data to be sent out from terminal 2, then station apparatus 1 receives only a next report R23. Thereafter, a similar process is repeated and station apparatus 1 sequentially assigns a band to terminals 2 to 4 and repeats data reception.

According to the sequence shown in FIG. 6, the waiting time from arrival of data sent out from user networks 12 to 14 (FIG. 1) at corresponding terminals 2 to 4 until being sent out therefrom depends on the time period from when terminals 2 to 4 send out reports until sending out data corresponding to the reports. That is, the waiting time changes depending on the amount of data sent out from all terminals 2 to 4.

For example, if all amounts of sent outs requested that are indicated by reports from terminals 2 to 4 are allowed, the waiting time from sending out reports until sending out data significantly increases, which in turn not only affects service that requires real-time processing but also greatly affects TCP (Transmission Control Protocol) throughput. Hence, station apparatus 1 needs to control the amounts of data sent out from terminals 2 to 4 such that waiting times in the buffers in the terminals can be kept within an allowable time.

In the above-described sequence (FIG. 6), when, for example, a grant G42 is sent out to terminal 4, information of the same grant G42 is also sent from control signal processing portion 104 to next-receive-burst determining portion 106 in FIG. 2. Based on the grant G42, during a gap period between bursts before receiving a report R42, next-receive-burst determining portion 106 notifies optical receiving portion 109 and PON receiving portion 107 of transmission rate H (10 Gbps)

of a burst (report R42+data D41) to be received next. Optical receiving portion 109 and PON receiving portion 107 having received the notification allow the receive function to support 10 Gbps and wait for the burst. Hence, upon arrival of the burst, a receive condition that supports transmission rate H is ready and thus synchronization can be extremely promptly established.

Similarly, when a grant G32 is sent out to terminal 3, information of the same grant G32 is also sent from control signal processing portion 104 to next-receive-burst determining portion 106. Based on the grant G32, during a gap period between bursts between data D41 and a report R32, next-receive-burst determining portion 106 notifies optical receiving portion 109 and PON receiving portion 107 of transmission rate M (2 Gbps) of a burst (report R32+data D31) to be received next. Optical receiving portion 109 and PON receiving portion 107 having received the notification allow the receive function to support 2 Gbps and wait for the burst. Hence, upon arrival of the burst, a receive condition that supports transmission rate M is ready and thus synchronization can be extremely promptly established. Thereafter, similarly, prompt synchronization establishment is enabled, making it possible to increase efficiency of upstream communication.

In the manner described above, station apparatus 1 can obtain information on timing at which an upstream signal is to be received next and a transmission rate thereof, before actual reception, based on grants to be provided to terminals 2 to 4. Also, by receiving a signal in a state in which the receive function is allowed to support that transmission rate, synchronization can be promptly established. Accordingly, synchronization is simply and promptly established with a transmission rate for upstream communication, making it possible to increase efficiency of upstream communication.

Note that although in the above description terminals 2 to 4 have already participated in the PON system, in practice, there is a procedure by which a terminal in a power-off state that is not recognized by station apparatus 1 is recognized by station apparatus 1 by power-on and participates in the PON system. This procedure is called a discovery process and is defined in the IEEE Standard 802.3ah-2004, Clause 64. The discovery process will be described below.

In the first place, a terminal before being recognized by station apparatus 1 has no chance to be given a grant. On the other hand, all terminals cannot perform upstream communication unless being explicitly given a grant from station apparatus 1. Hence, station apparatus 1 periodically performs a discovery process for detecting a terminal (hereinafter, referred to as an unregistered terminal) whose power is turned on from being off (including non-connection), thereby attempting to participate in the PON system, to give the unregistered terminal a chance to respond.

Figure 7:
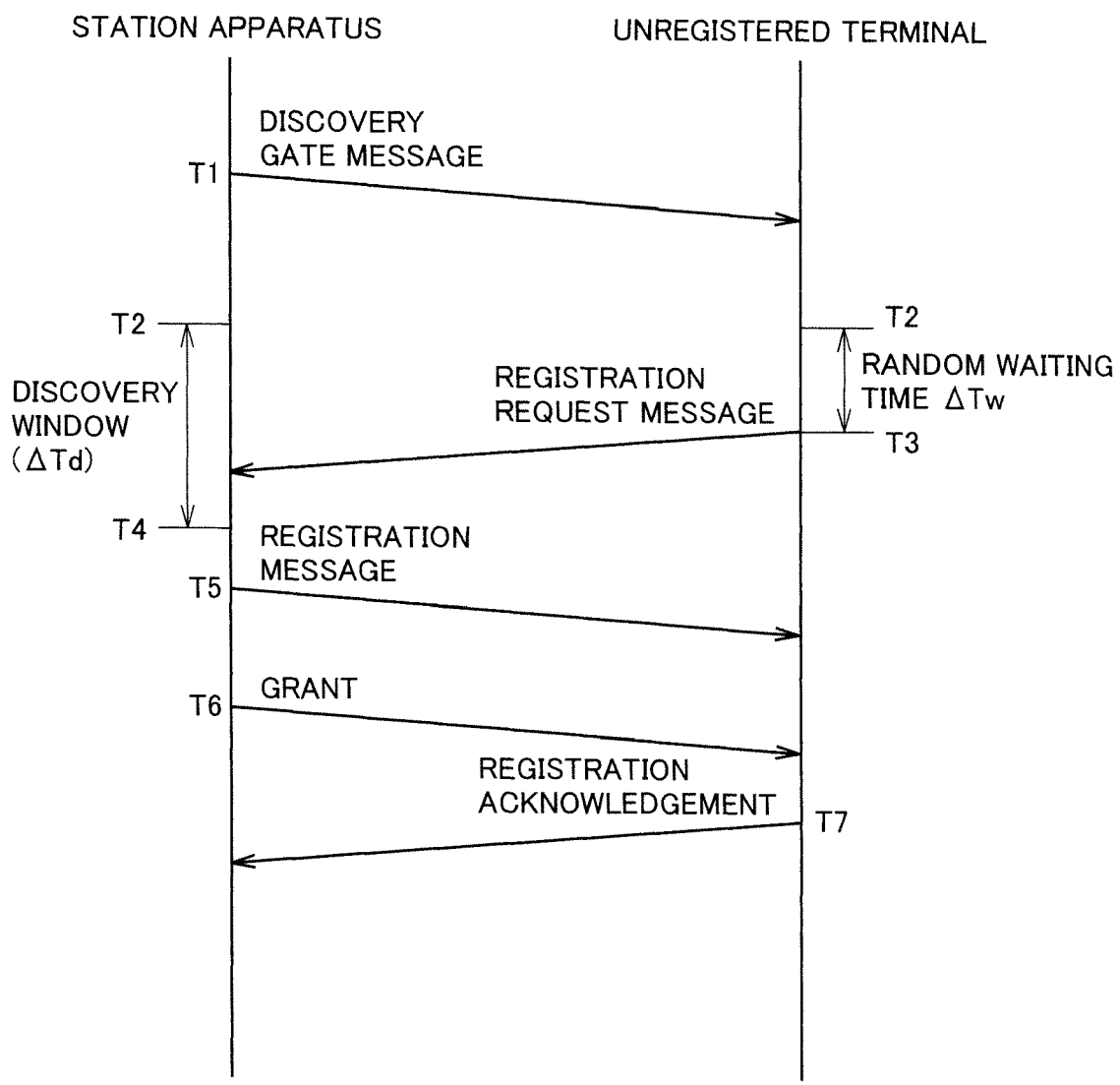
FIG. 7 is a diagram showing a discovery process performed between the station apparatus and an unregistered terminal.

FIG. 7 is a diagram showing a discovery process performed between a station apparatus and an unregistered terminal. In the drawing, the station apparatus starts a discovery process at time T1 and broadcasts a discovery gate message in the downstream direction. The discovery gate message includes information on start time of a discovery period during which a response to the discovery gate message is allowed and the length of the period. The discovery period is called a discovery window and is, for example, a time period ΔTd from times T2 to T4.

The unregistered terminal having received the discover gate message waits a random waiting time ΔTw having a random length of time from time T2 (in synchronization with the station apparatus) and transmits, at time T3, a registration request message to the station apparatus. The random waiting time ΔTw has a random value within a range in which the registration request message stays in the discovery window. Therefore, supposedly, even when there are a plurality of unregistered terminals that attempt to participate in the PON system, the probability that registration request messages from the plurality of unregistered terminals collide with each other can be reduced.

The registration request message includes a MAC address as an individual identification number of the unregistered terminal. The station apparatus having succeeded in receiving the registration request message assigns a logical link identifier (LLID) on the PON system to the unregistered terminal and registers the MAC address and the LLID in the PON system such that they are associated with each other. Next, the station apparatus transmits, at time T5, a registration message to the newly registered terminal. The registration message includes information on the LLID of the terminal and synchronization time required when the station apparatus receives upstream burst communication.

Thereafter, at time T6, the station apparatus transmits a grant (grant gate message) allowing for upstream communication, to the terminal. The unregistered terminal having received the grant transmits, at time T7, a registration acknowledgement using the grant to the station apparatus. The station apparatus receives the registration acknowledgement, whereby the discovery process ends. Thereafter, normal communication of the PON system starts.

In the configuration of the PON system shown in FIG. 1, if, for example, the above-described discovery process is performed on all terminals 2 to 4, station apparatus 1 needs to receive registration request messages from respective terminals 2 to 4. Although in normal PON communication after terminals 2 to 4 have participated in the PON system, as described above, the receive condition of station apparatus 1 can be made ready (the receive function is allowed to support a transmission rate) based on a grant, this cannot be done at an unregistration stage. Hence, station apparatus 1 receives upstream communication (registration request message) from an unregistered terminal in the following manner.

<<Limitation on a Transmission Rate>>

First, a configuration will be described in which a registration request message is received with a transmission rate being limited. This is based on the idea that even with terminals 2 to 4 whose transmission rates in normal PON communication differ from one another, for a registration request message, a limited predetermined transmission rate (typically, L) is used.

In this case, terminal 2 with transmission rate L transmits a registration request message at transmission rate L, as with normal PON communication. On the other hand, when terminal 4 with transmission rate H shown in FIG. 4 receives a discovery gate message, terminal 4 sends the discovery gate message from control signal processing portion 406 to transmitting-portion switching determining portion 410. Thus, transmitting-portion switching determining portion 410 switches a transmit function from PON transmitting portion 405 to registration request transmitting portion 411. Then, control signal processing portion 406 allows a registration request message to be transmitted from registration request transmitting portion 411 at transmission rate L.

Hence, terminal 4 with transmission rate H in normal PON communication performs transmission at transmission rate L for a registration request message. Note that after transmitting a registration request message, transmitting-portion switching determining portion 410 brings the transmit function back to PON transmitting portion 405 from registration request transmitting portion 411.

Similarly, terminal 3 with transmission rate M in normal PON communication performs transmission at transmission rate L for a registration request message, etc.

As a result, registration request messages arriving at station apparatus 1 from unregistered terminals 2 to 4 within a discovery window period (when the power to two or three terminals are simultaneously turned on, registration request messages randomly arrive in tandem within the same period) are all sent at transmission rate L. On the other hand, next-receive-burst determining portion 106 of station apparatus 1 notifies optical receiving portion 109 and PON receiving portion 107 of transmission rate L of a burst (registration request message) to be received next in response to a discovery gate message. Optical receiving portion 109 and PON receiving portion 107 having received the notification allow the receive function to support transmission rate L and wait for a registration request message.

Accordingly, in station apparatus 1, upon arrival of a registration request message, a receive condition that supports transmission rate L is ready and thus registration request messages from unregistered terminals 2 to 4 can be promptly and reliably received.

Note that for a registration acknowledgement, as in the case of normal PON communication, based on grants provided to terminals 2 to 4 before that, the receive function of station apparatus 1 can be allowed to support a transmission rate.

Note that although in the above-described example terminal 2 has the configuration in FIG. 3 and terminals 4 and 3 have the configuration in FIG. 4, instead of this, terminals 2 and 3 may have the configuration in FIG. 3 and only terminal 4 may have the configuration in FIG. 4. In this case, terminal 2 transmits a registration request message at transmission rate L and terminal 3 at transmission rate M. Terminal 4 transmits a registration request message at transmission rate L (which may be M) by switching the transmitting portions, as in the manner described above. As a result, three types of transmission rate present in normal PON communication are limited to two types, L and M, for a registration request message. In this case, station apparatus 1 establishes synchronization with transmission rate L or M after actually receiving a registration request message. At least the types of transmission rate can be narrowed down over those for normal PON communication and thus relatively registration request messages can be promptly and reliably received. In addition, a reduction in the number of types of transmission rate, which one of them is to be used is unknown, also contributes to a simplification of the receive function (optical receiving portion 109 and PON receiving portion 107).

Note that it is desirable that a limited predetermined transmission rate be specified by the station apparatus. In this case, the transmission rate can be switched depending on the times. For example, in times where there are both a terminal of type A with a transmission rate of L and a terminal of type B with a normal transmission rate of M (>L) and a discovery response transmission rate of L, L should be specified as the predetermined transmission rate. Thereafter, if replacement of the terminals is performed and as a result the terminal of type A is removed and only the terminal of type B remains, then M is specified as the predetermined transmission rate. As such, while operating the PON system, a transmission rate used for discovery is increased according to generational change in terminals, whereby transmission efficiency can be increased.

<<Association of a Discovery Gate Message with a Transmission Rate>>

Next, a configuration will be described in which by association of a discovery gate message with a transmission rate, a registration request message is received at a predetermined transmission rate. This is based on the idea that by allowing a discovery gate message to have a transmission rate specifying function, discovery responses can be received separately for each transmission rate.

Specifically, station apparatus 1 uniquely provides discovery windows respectively for terminals 2 to 4 such that they do not overlap one another. Then, in order to indicate which upstream transmission rate's terminal a discovery window that starts from now is targeted for, station apparatus 1 stores specifying information on a transmission rate at which a response should be made, in a discovery gate message. Then, a terminal having received the discovery gate message compares the transmission rate specified in the discovery gate message with its own upstream transmission rate, and transmits a registration request message only when the transmission rate matches. On the other hand, station apparatus 1 allows the receive function to support the transmission rate specified in the discovery gate message and receives a registration request message.

As such, discovery windows are set at different times for each of a plurality of types of transmission rate and a transmission rate at which a discovery response should be made is specified and an unregistered terminal makes a discovery response in a discovery window corresponding to a transmission rate used by the unregistered terminal, whereby it becomes unnecessary for each terminal to have the ability to perform transmission at a plurality of transmission rates. Accordingly, without using the circuit in FIG. 4, the configuration in FIG. 3 can be employed in all terminals. With this configuration, the terminals are simplified, contributing to cost reduction.

For example, when station apparatus 1 specifies transmission rate L in a discovery gate message, station apparatus 1 allows the receive function to support transmission rate L and waits for a registration request message. Then, in response to the broadcasted discovery gate message, only terminal 2 with upstream transmission rate L (in the case of unregistration) transmits a registration request message. The same also applied to other transmission rates M and H.

<<Association of a Wavelength for Downstream Communication with a Transmission Rate>>

Next, a configuration will be described in which by association of a wavelength for downstream communication with a transmission rate, a registration request message is received at a predetermined transmission rate. This is based on the idea that by allowing wavelengths for downstream communication and transmission rates of terminals to have a one-to-one correspondence, discovery responses can be separately received for each transmission rate.

Figure 8:
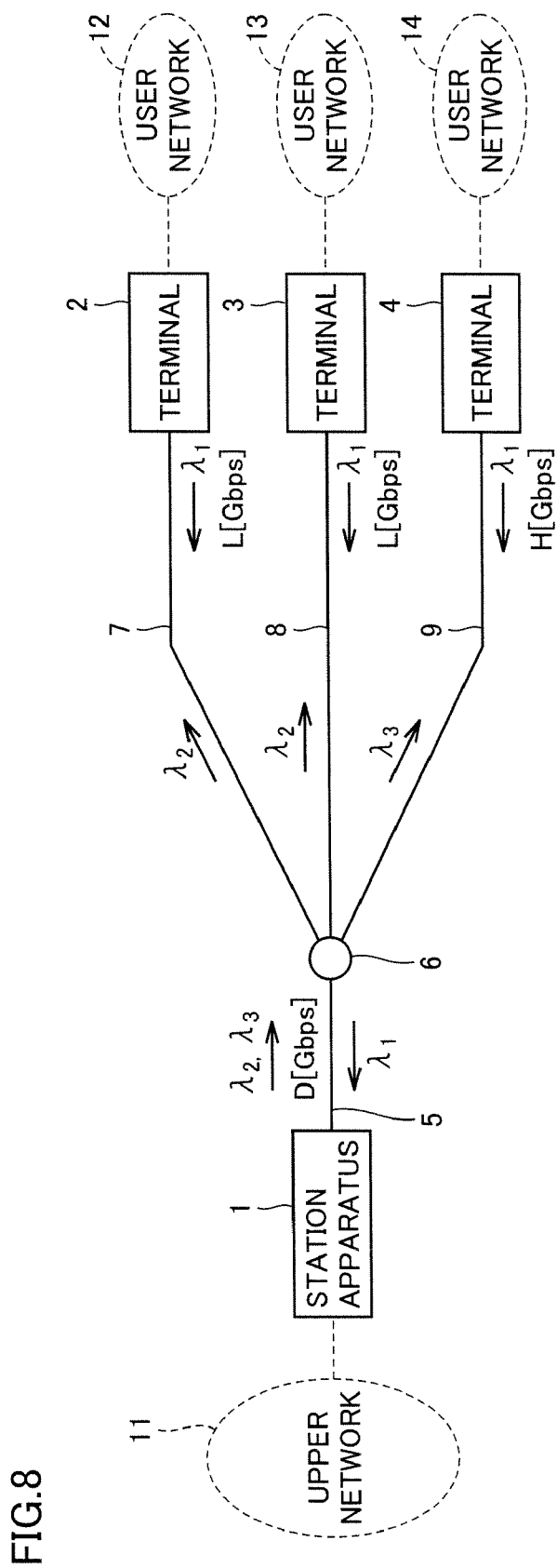
FIG. 8 is a connection diagram of a PON system of a different configuration than that in FIG. 1.

FIG. 8 is a connection diagram of a PON system different from that in FIG. 1. Differences from FIG. 1 are that downstream communication from station apparatus 1 is performed by two-wavelength multiplexing and that the upstream transmission rate of terminal 3 is L. That is, for downstream communication, wavelength $\lambda_2$ is used for terminals 2 and 3 and a wavelength $\lambda_3$ is used for terminal 4. Also, for upstream communication, terminals 2 and 3 use transmission rate L and terminal 4 uses transmission rate H. Namely, there are one-to-one correspondences such as wavelength $\lambda_2$—transmission rate L and wavelength $\lambda_3$—transmission rate H.

Station apparatus 1 provides discovery windows independent of each other for two types of transmission rate L and H such that they do not overlap each other. Then, when station apparatus 1 transmits a discovery gate message at wavelength $\lambda_2$, station apparatus 1 allows the receive function to support transmission rate L and receives registration request messages from terminals 2 and 3 (in the case of unregistration). Alternatively, when transmitting a discovery gate message at wavelength $\lambda_3$, station apparatus 1 allows the receive function to support transmission rate H and receives a registration request message from terminal 4 (in the case of unregistration).

As such, by allowing wavelengths for downstream communication and transmission rates of terminals to have a one-to-one correspondence, information on a transmission rate does not need to be stored in a discovery gate message and also a terminal does not need to check whether a transmission rate of the terminal is specified. Furthermore, by wavelength multiplexing of downstream communication, downstream communication capacity can be increased as compared with the case of one downstream wavelength.

The invention claimed is:

1. A station apparatus used for passive optical network system in which communication is performed at a plurality of types of transmission rate in an upstream direction from a plurality of terminals connected to a station apparatus through optical fibers, the station apparatus comprising:
  a transmitter;
  a receiver; and
  a controller configured to:
    set the discovery period at different times for each of the plurality of types of transmission rate; and
    specify a transmission rate at which a discovery response should be made.

2. The station apparatus according to claim 1, wherein the station apparatus is configured to transmit, in downstream communication to the terminals, a signal for starting a discovery process at a plurality of types of wavelength having a one-to-one correspondence with the transmission rates.

* * * * *